(12) United States Patent
Liu (10) Patent No.: US 11,846,188 B2
(45) Date of Patent: Dec. 19, 2023

(54) METHOD FOR ROTARY CLEARING IN STRIPPING TOOTH HOLDER OF MINING MACHINE AND ROTARY CLEARING DEVICE IN STRIPPING TOOTH HOLDER

(71) Applicant: Suhua Liu, Shandong (CN)

(72) Inventor: Suhua Liu, Shandong (CN)

(73) Assignee: Suhua Liu, Shandong (CN)

( * ) Notice: Subject to any disclaimer, the term of this patent is extended or adjusted under 35 U.S.C. 154(b) by 0 days.

(21) Appl. No.: 17/641,441

(22) PCT Filed: Sep. 10, 2020

(86) PCT No.: PCT/CN2020/114447
§ 371 (c)(1),
(2) Date: Mar. 9, 2022

(87) PCT Pub. No.: WO2021/047580
PCT Pub. Date: Mar. 18, 2021

(65) Prior Publication Data
US 2022/0372875 A1 Nov. 24, 2022

(30) Foreign Application Priority Data

Sep. 10, 2019 (CN) .......................... 201910852883.1

(51) Int. Cl.
*E21C 25/68* (2006.01)
*E21C 25/02* (2006.01)
*E21C 35/20* (2006.01)

(52) U.S. Cl.
CPC .............. *E21C 25/68* (2013.01); *E21C 25/02* (2013.01); *E21C 35/20* (2013.01)

(58) Field of Classification Search
CPC ........... E21C 25/68; E21C 25/02; E21C 35/20
See application file for complete search history.

(56) References Cited

U.S. PATENT DOCUMENTS

| 1,257,582 A * | 2/1918 | Conrad .................. E21C 35/20 299/44 |
| 3,646,728 A | 3/1972 | Holler, Jr. |

(Continued)

FOREIGN PATENT DOCUMENTS

| CN | 102748024 A | 10/2012 |
| CN | 204283425 U | 4/2015 |

(Continued)

OTHER PUBLICATIONS

International Search Report for corresponding application PCT/CN2020/114447 filed Sep. 10, 2020; dated Dec. 3, 2020.

(Continued)

*Primary Examiner* — Janine M Kreck
(74) *Attorney, Agent, or Firm* — Gang Yu (57) ABSTRACT

Disclosed are a method for rotary clearing in a stripping tooth holder of a mining machine and a rotary clearing device in a stripping tooth holder implementing the method. The rotary clearing device includes a reciprocating impact power box (2), a stripping tooth holder (3), a rotary clearer supporting mechanism (4) and a rotary clearer (5), where the rotary clearer (5) includes a shifter (6) and a clearing drive roller (7), the reciprocating impact power box (2) includes a reciprocating impact power box power member (8), the reciprocating impact power box power member (8) supports and drives the stripping tooth holder (3), the rotary clearer supporting mechanism (4) is arranged on the reciprocating impact power box (2) or on the stripping tooth holder (3), a rear end of the stripping tooth holder (3) is connected to the reciprocating impact power box power member (8).

8 Claims, 13 Drawing Sheets

(56) References Cited

U.S. PATENT DOCUMENTS

| | | | | | |
|---|---|---|---|---|---|
| 3,957,305 | A | * | 5/1976 | Peterson | ............... E21C 35/20 297/86 |
| 4,046,424 | A | * | 9/1977 | Montgomery | .......... E21C 35/20 299/56 |
| 4,159,149 | A | * | 6/1979 | Castanoli | ............... E21C 35/20 299/87.1 |

FOREIGN PATENT DOCUMENTS

| CN | 204402476 | U | 6/2015 |
|---|---|---|---|
| CN | 105971596 | A | 9/2016 |
| CN | 2017012590 | A3 | 5/2017 |
| CN | 109322665 | A | 2/2019 |
| DE | 3435979 | A1 | 4/1986 |
| WO | 2016141895 | A1 | 9/2016 |

OTHER PUBLICATIONS

First Examination Report for corresponding IN application No. 202217021428.

\* cited by examiner

METHOD FOR ROTARY CLEARING IN STRIPPING TOOTH HOLDER OF MINING MACHINE AND ROTARY CLEARING DEVICE IN STRIPPING TOOTH HOLDER

TECHNICAL FIELD

The disclosure relates to the field of machinery, in particular to a method for rotary clearing in a stripping tooth holder of a mining machine and a rotary clearing device in a stripping tooth holder.

BACKGROUND

A reciprocating impact or sawing mining machine features little dust, low energy consumption and high lumping rates during mining, and is the most advanced and scientific mining apparatus. However, its materials produced under impact are piled up in reciprocating impact tooth holders, which makes a machine body travel with great resistance and further results in difficulty in traveling or even halt due to frequent overloading. In order to solve the problem that a motor is overloaded and burned down or damaged due to resistance increase of accumulated materials, the disclosure provides a method for rotary clearing in a stripping tooth holder of a mining machine and a rotary clearing device in a stripping tooth holder implementing the method.

SUMMARY

The disclosure is implemented through the following technical solution:

a rotary clearing device in a stripping tooth holder includes a reciprocating impact power box, a machine body, a stripping tooth holder, a rotary clearer supporting mechanism, a rotary clearer, etc., where the rotary clearer includes a shifter, a clearing drive roller, etc., the reciprocating impact power box includes a reciprocating impact power box power member, etc., the reciprocating impact power box power member supports and drives the stripping tooth holder, the rotary clearer supporting mechanism is arranged on the reciprocating impact power box or on the stripping tooth holder, a rear end of the stripping tooth holder is connected to the reciprocating impact power box power member, a front end of the stripping tooth holder is provided with a reciprocating impact tooth or a reciprocating impact saw plate, the rotary clearer is arranged in a rotary discharging tooth holder hole of the stripping tooth holder, the rotary clearer rotates under supporting by the rotary clearer supporting mechanism, the clearing drive roller rotates to drive the shifter, and the shifter spirally pushes material stripped off by the stripping tooth holder out of the rotary discharging tooth holder hole.

The shifter includes an inclined clearing plate, an inclined clearing tooth, a clearing rake, a clearing flat plate, etc., a surface of the inclined clearing plate forms a discharging included angle with an axis of the clearing drive roller, and the inclined clearing plate rotates to drive the material out of the rotary discharging tooth holder hole under the discharging included angle, so as to clear the material stripped off by the stripping tooth holder in time, prevent material accumulation and blockage and reduce traveling resistance of a machine body.

The rotary discharging tooth holder hole includes a circular discharging hole, a rectangular discharging hole, an elliptical discharging hole, a triangular discharging hole, etc., and when the circular discharging hole is used, an axis of the circular discharging hole and an axis of the rotary clearer are coaxial, for facilitating clearing of a large quantity of material in the rotary discharging tooth holder hole, or not coaxial.

The rotary clearing device in a stripping tooth holder includes a machine body, the machine body supports the reciprocating impact power box, and the rotary clearer supporting mechanism is arranged on the reciprocating impact power box or on the machine body.

The reciprocating impact saw plate includes a reciprocating impact saw blade, a reciprocating impact saw rhombic frame, a reciprocating impact saw rectangular frame, a reciprocating impact saw circular frame, a reciprocating impact saw elliptical frame, etc., the stripping tooth holder includes a material impact section, etc., and the reciprocating impact saw blade is arranged along the material impact section, such that the stripping tooth holder forms a tooth ring frame impact saw towards the material.

The stripping tooth holder includes a left stripping tooth ring, a right stripping tooth ring, etc., a tooth ring baffle plate is arranged, towards the reciprocating impact power box, between the left stripping tooth ring and the right stripping tooth ring, the stripping tooth holder is connected to the reciprocating impact power box power member through the tooth ring baffle plate or the left stripping tooth ring or the right stripping tooth ring, the reciprocating impact power box power member drives the stripping tooth holder to impact for sawing in a reciprocating manner, the rotary clearer supporting mechanism is arranged on the reciprocating impact power box or on the machine body, the rotary clearer rotates under supporting by the rotary clearer supporting mechanism, and when a lump material is stuck between the rotary clearer and the stripping tooth holder, the stripping tooth holder reciprocates to break the lump material, such that the rotary clearer can smoothly spirally push the material out of the rotary discharging tooth holder hole.

The inclined clearing plate includes curved clearing plates, etc., the curved clearing plates form a spiral clearer, and the material may be spirally pushed out of one side of the rotary discharging tooth holder hole through the spiral clearer conveniently.

The disclosure has the following beneficial effects:

1. The reciprocating impact power box power member supports and drives the stripping tooth holder, the rotary clearer supporting mechanism is arranged on the reciprocating impact power box or on the stripping tooth holder, a rear end of the stripping tooth holder is connected to the reciprocating impact power box power member, a front end of the stripping tooth holder is provided with a reciprocating impact tooth or a reciprocating impact saw plate, the rotary clearer is arranged in a rotary discharging tooth holder hole of the stripping tooth holder, the rotary clearer rotates under supporting by the rotary clearer supporting mechanism, the clearing drive roller rotates to drive the shifter, and the shifter spirally pushes material stripped off by the stripping tooth holder out of the rotary discharging tooth holder hole. The disclosure utilizes a structural principle of spiral pushing of the rotary clearer to push the accumulated material out of the rotary discharging tooth holder hole, thus greatly reducing resistance of material accumulation, reducing the resistance of reciprocating operation of the stripping tooth holder, reducing the traveling resistance of the machine body, guaranteeing that the stripping tooth holder drives the reciprocating impact tooth or the reciprocating impact saw plate to smoothly cut the material, guaranteeing smooth traveling of the machine body, completely solving the problem of motor overload burning or motor damage caused by resistance increase of material accumulation, truly applying the reciprocating impact mining machine or the reciprocating sawing mining machine to actual mining, and guaranteeing operation of the reciprocating impact mining machine or the reciprocating sawing mining machine with little dust, low energy consumption and high lumping rates during use on a mining site.

2. The surface of the inclined clearing plate forms the discharging included angle with the axis of the clearing drive roller, and the inclined clearing plate rotates to drive the material out of the rotary discharging tooth holder hole under the discharging included angle, so as to clear the material stripped off by the stripping tooth holder in time, prevent material accumulation and blockage, and reduce the traveling resistance of the machine body. The material is guided into the conveyor through a cambered surface of the inclined clearing plate, thus avoiding overload burning or motor damage fault caused by accumulation of a large amount of material between the conveyor and the stripping tooth holder.

3. When the circular discharging hole is used, the axis of the circular discharging hole and the axis of the rotary clearer are coaxial, for facilitating expansion of the clearing plate of the rotary clearer and clearing of a large quantity of material in the rotary discharging tooth holder hole, or not coaxial.

4. The machine body supports the reciprocating impact power box, the rotary clearer supporting mechanism is arranged on the reciprocating impact power box or on the machine body, the machine body or the reciprocating impact power box is used for fixing the rotary clearer, and the stripping tooth holder is driven by the reciprocating power box power member to perform sawing in a reciprocating manner.

5. The reciprocating impact saw blade is arranged along the material impact section, such that the stripping tooth holder forms a tooth ring frame impact saw, and the rotary clearer does not reciprocate with a clearing tooth holder, thus avoiding vibration and wear caused by reciprocating of the rotary clearer, and making the rotary clearer operate stably and have a long service life.

6. The tooth ring baffle plate is arranged, towards the reciprocating impact power box, between the left stripping tooth ring and the right stripping tooth ring, the stripping tooth holder is connected to the reciprocating impact power box power member through the tooth ring baffle plate or the left stripping tooth ring or the right stripping tooth ring, the reciprocating impact power box power member drives the stripping tooth holder to impact for sawing in a reciprocating manner, the rotary clearer supporting mechanism is arranged on the reciprocating impact power box or on the machine body, the rotary clearer rotates under supporting by the rotary clearer supporting mechanism, and when the lump material is stuck between the rotary clearer and the stripping tooth holder, the stripping tooth holder reciprocates to break the lump material, such that material sticking and blockage accidents between the rotary clearer and the stripping tooth holder are avoided, and the rotary clearer can smoothly spirally push the material out of the rotary discharging tooth holder hole.

7. The curved clearing plates form the spiral clearer, and the material may be spirally pushed out of one side of the rotary discharging tooth holder hole through the spiral clearer conveniently, and the material may be conveniently conveyed out according to site requirements.

In the figures: 1—rotary clearing device in a stripping tooth holder, 2—reciprocating impact power box, 3—stripping tooth holder, 4—rotary clearer supporting mechanism, 5—rotary clearer, 6—shifter, 7—clearing drive roller, 8—reciprocating impact power box power member, 9—reciprocating impact tooth, 10—reciprocating impact saw plate, 11—rotary discharging tooth holder hole, 12—inclined clearing plate, 13—inclined clearing tooth, 14—clearing rake, 15—clearing flat plate, 16—discharging included angle, 17—circular discharging hole, 18—rectangular discharging hole, 19—machine body, 20—reciprocating impact saw blade, 21—reciprocating impact saw rhombic frame, 22—material impact section, 23—tooth ring frame impact saw, 24—left stripping tooth ring, 25—right stripping tooth ring, 26—tooth ring baffle plate, 27—curved clearing plate and 28—spiral clearer.

DETAILED DESCRIPTION OF THE EMBODIMENTS

Embodiment 1

Figure 1:
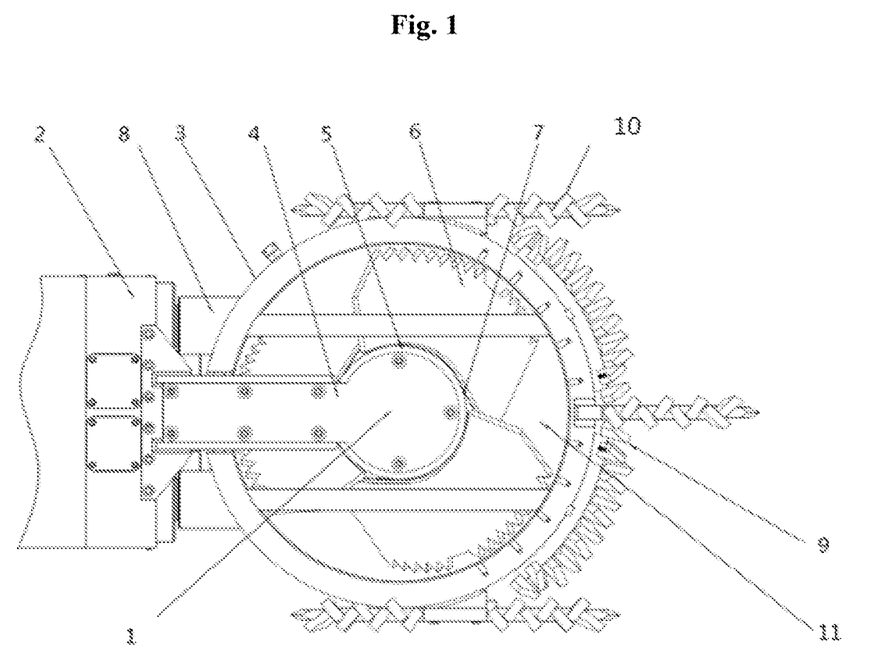
FIG. 1 shows a front view of a rotary clearing device in a stripping tooth holder implementing a method for rotary clearing in a stripping tooth holder of a mining machine in Embodiment 1.

As shown in FIG. 1, a rotary clearing device in a stripping tooth holder 1 includes a reciprocating impact power box 2, a stripping tooth holder 3, a rotary clearer supporting mechanism 4 and a rotary clearer 5, where the rotary clearer 5 includes a shifter 6 and a clearing drive roller 7, the reciprocating impact power box 2 includes a reciprocating impact power box power member 8, the reciprocating impact power box power member 8 supports and drives the stripping tooth holder 3, the rotary clearer supporting mechanism 4 is arranged on the reciprocating impact power box 2, a rear end of the stripping tooth holder 3 is connected to the reciprocating impact power box power member 8, a front end of the stripping tooth holder is provided with a reciprocating impact tooth 9, the rotary clearer 5 is arranged in the rotary discharging tooth holder hole 11 of the stripping tooth holder 3, the rotary clearer 5 rotates under supporting by the rotary clearer supporting mechanism 4, the clearing drive roller 7 rotates to drive the shifter 6, and the shifter 6 spirally pushes material stripped off by the stripping tooth holder 3 from the rotary discharging tooth holder hole 11.

Figure 2:
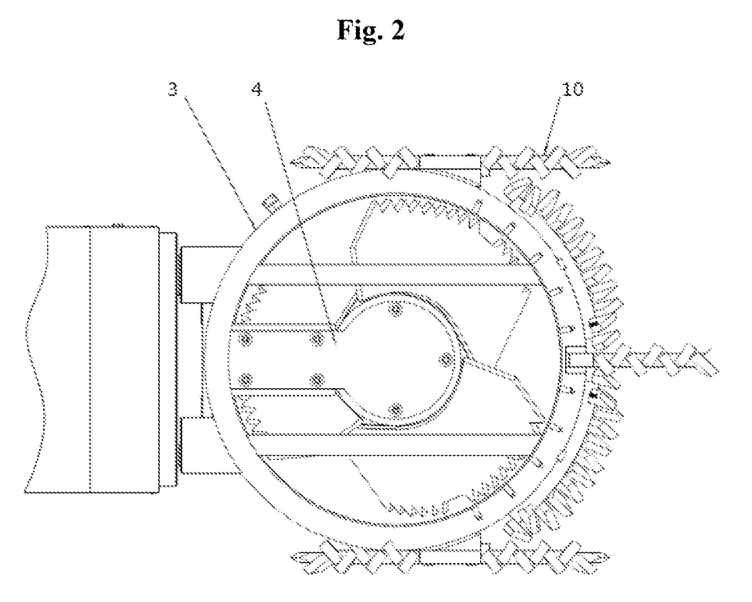
FIG. 2 shows a front view of the rotary clearing device in a stripping tooth holder in Embodiment 1.

As shown in FIG. 2, the rotary clearer supporting mechanism 4 may be arranged on the stripping tooth holder 3 alternatively.

Alternatively, the front end of the stripping tooth holder may be provided with a reciprocating impact saw plate 10.

Embodiment 2

Figure 3:
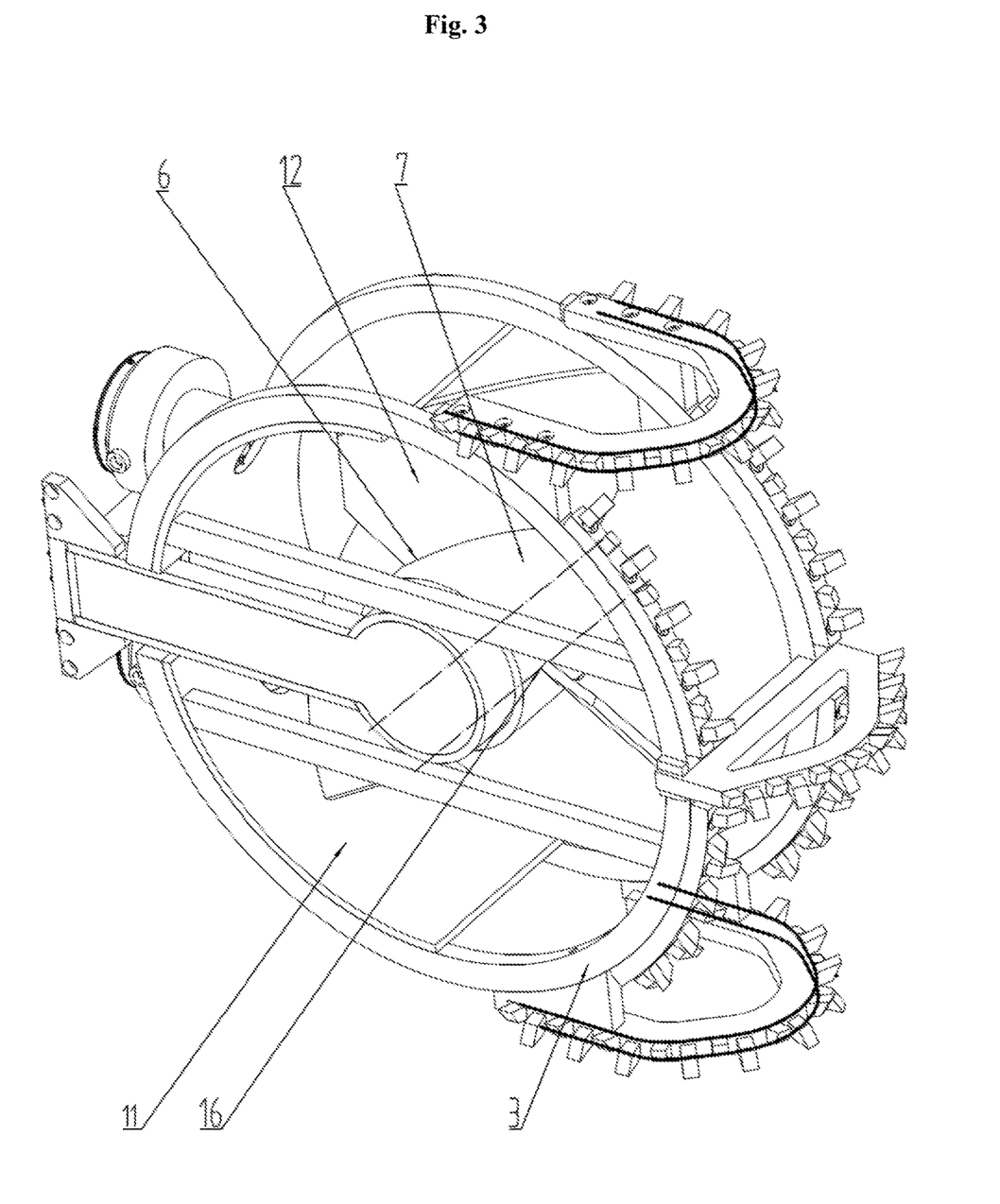
FIG. 3 shows a main structural view of a shifter in Embodiment 2.

As shown in FIG. 3, the shifter 6 includes an inclined clearing plate 12, a surface of the inclined clearing plate 12 forms a discharging included angle 16 with an axis of the clearing drive roller 7, and the inclined clearing plate 12 rotates to drive material out of the rotary discharging tooth holder hole 11 under the discharging included angle 16, so as to clear the material stripped off by the stripping tooth holder 3 in time and prevent material accumulation and blockage.

Figure 4:
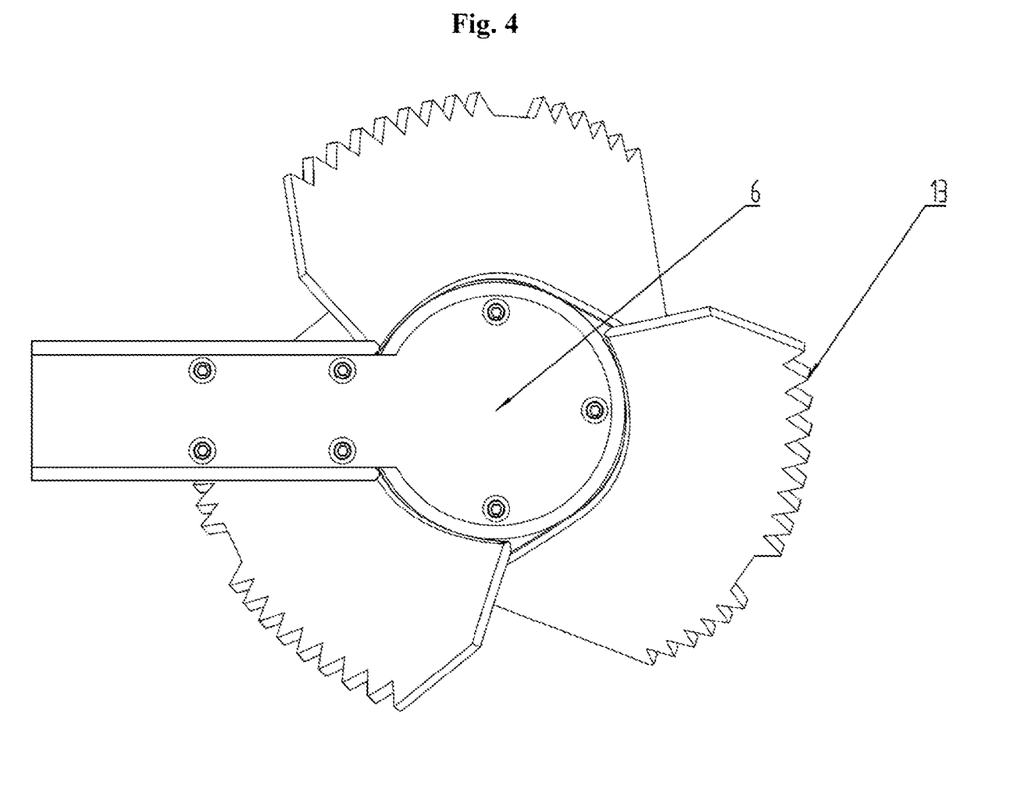
FIG. 4 shows the main structural view of the shifter in Embodiment 2.
Figure 5:
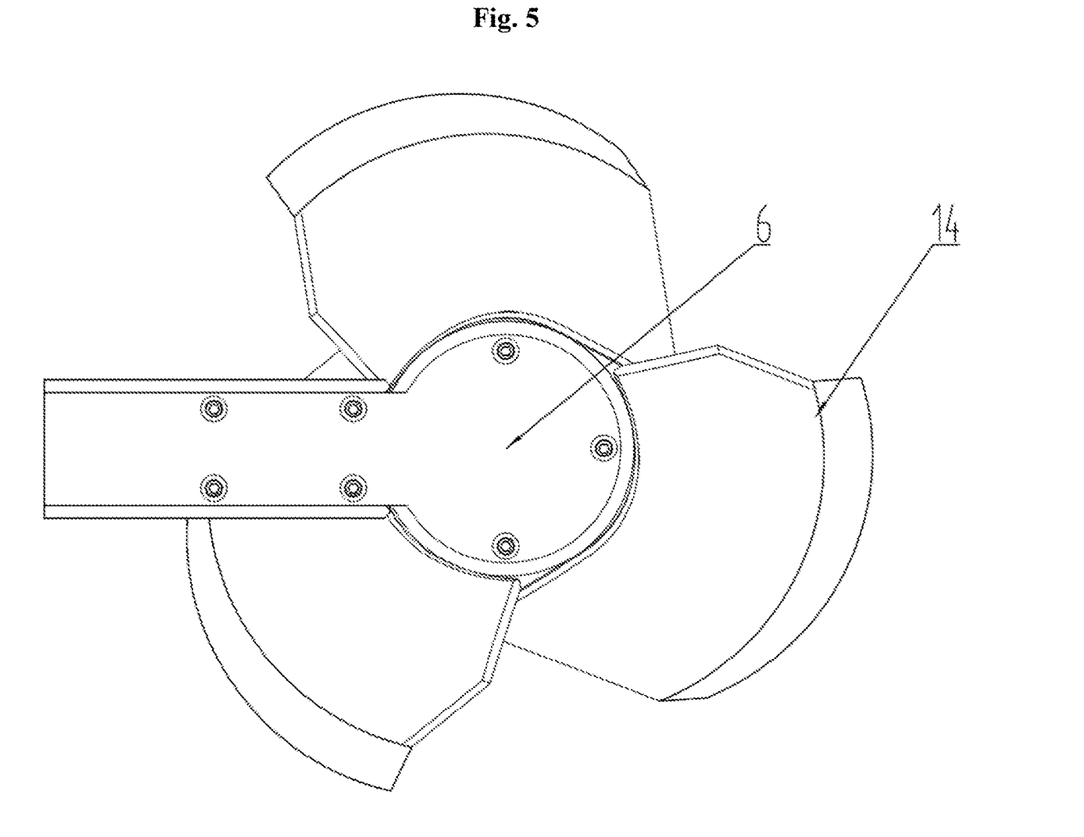
FIG. 5 shows the main structural view of the shifter in Embodiment 2.
Figure 6:
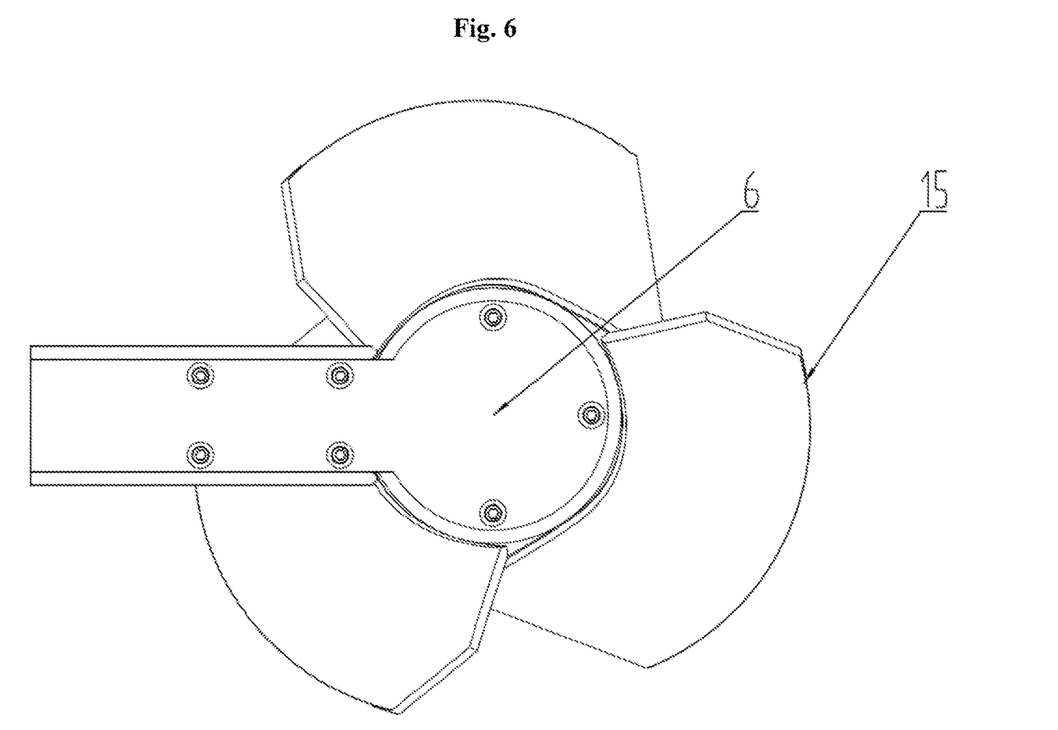
FIG. 6 shows a structural diagram of a rotary clearing device in a stripping tooth holder in Embodiment 2.

As shown in FIGS. 4-6, the shifter 6 may also include an inclined clearing tooth 13, a clearing rake 14 or a clearing flat plate 15.

The other contents are the same as those of Embodiment 1.

Embodiment 3

Figure 7:
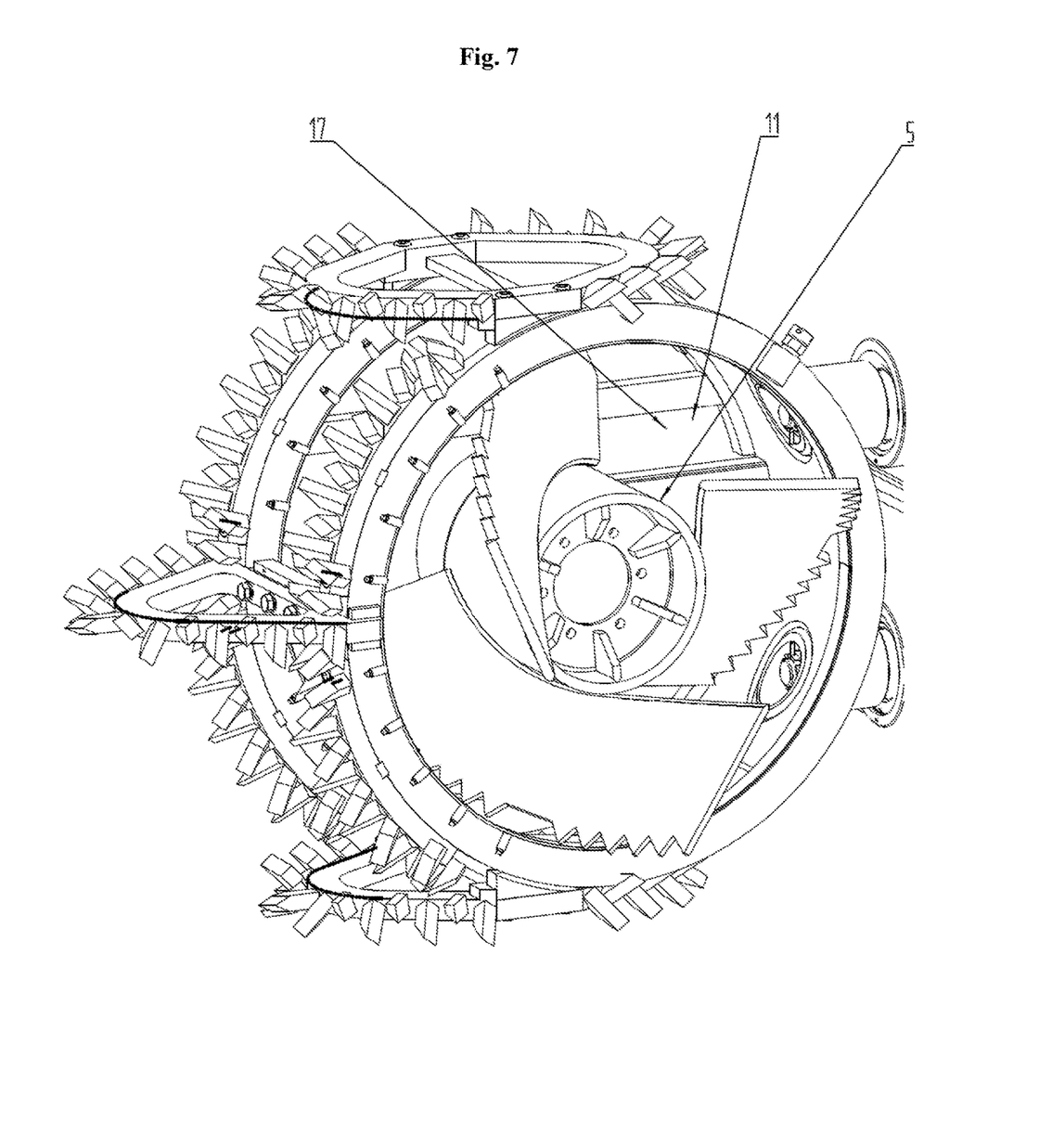
FIG. 7 shows a structural diagram of a rotary clearing device in a stripping tooth holder in Embodiment 3.

As shown in FIG. 7, the rotary discharging tooth holder hole 11 includes a circular discharging hole 17, and when the circular discharging hole 17 is used, an axis of the circular discharging hole 17 and an axis of the rotary clearer 5 are coaxial, for facilitating clearing of a large quantity of material in the rotary discharging tooth holder hole 11.

Figure 8:
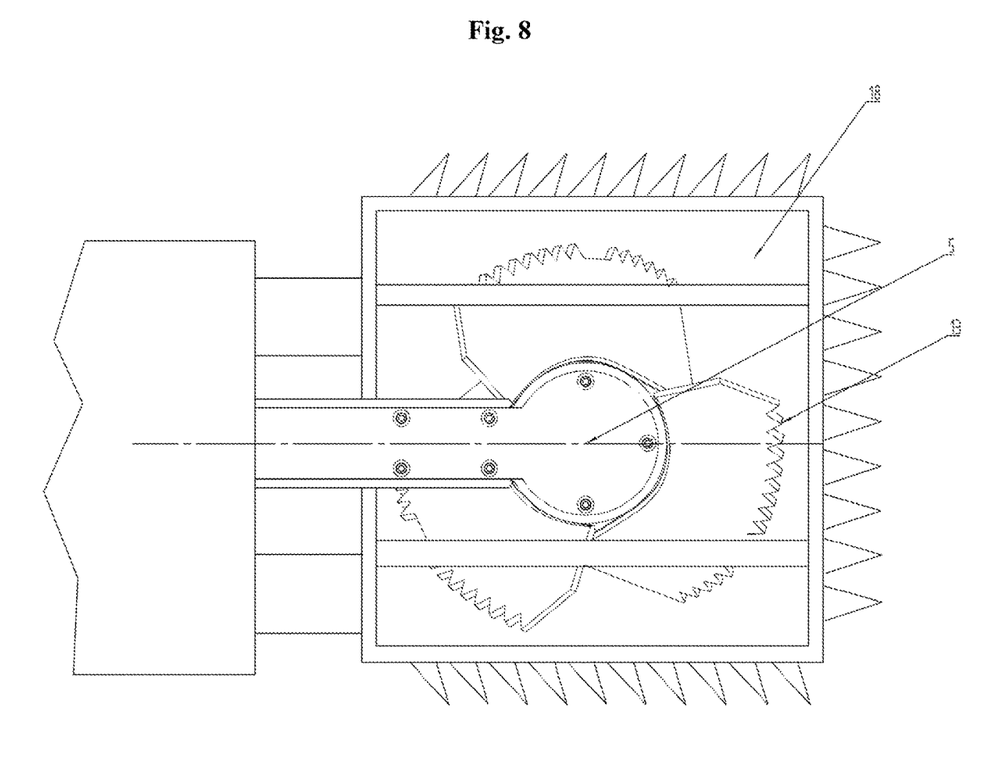
FIG. 8 shows the structural diagram of the rotary clearing device in a stripping tooth holder in Embodiment 3.

As shown in FIG. 8, the rotary discharging tooth holder hole 11 may also include a rectangular discharging hole 18, an elliptical discharging hole or a triangular discharging hole.

Alternatively, the axis of the circular discharging hole 17 and the axis of the rotary clearer 5 are not coaxial.

The other contents are the same as those of Embodiment 1.

Embodiment 4

Figure 9:
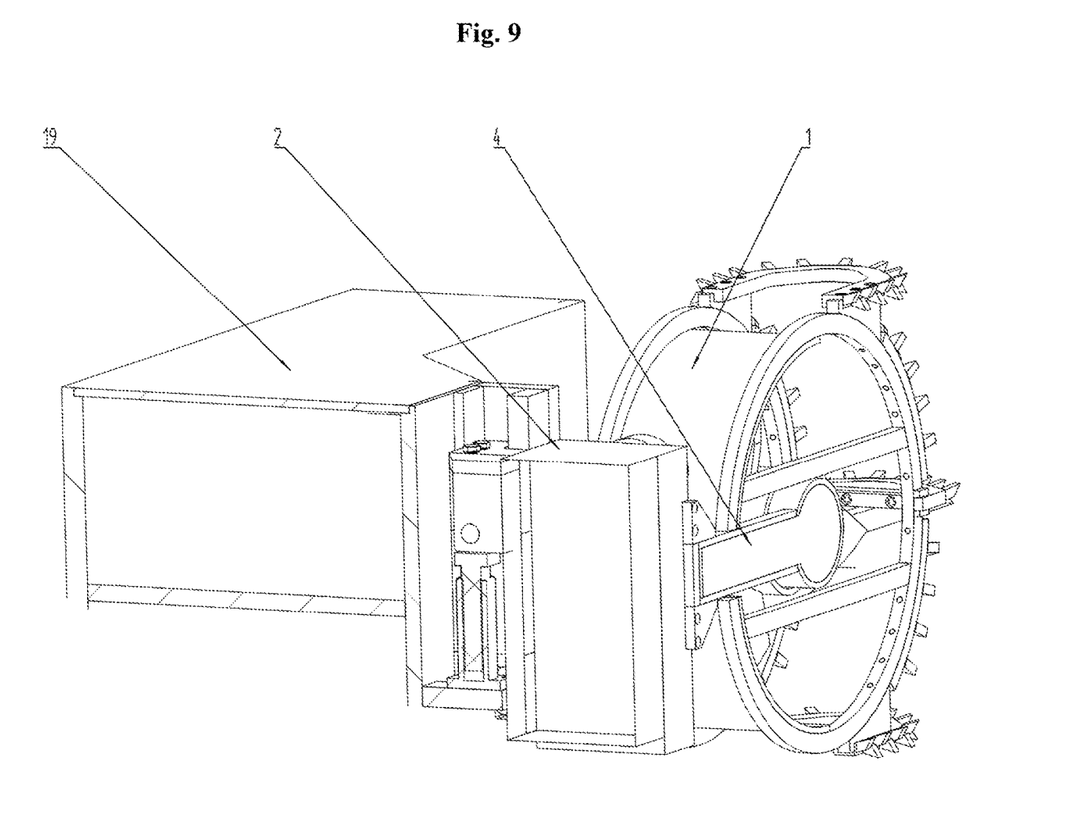
FIG. 9 shows a structural diagram of a rotary clearing device in a stripping tooth holder in Embodiment 4.

As shown in FIG. 9, the rotary clearing device 1 in the stripping tooth holder 3 includes a machine body 19, the machine body 19 supports the reciprocating impact power box 2, and the rotary clearer supporting mechanism 4 is arranged on the reciprocating impact power box 2.

Alternatively, the rotary clearer supporting mechanism 4 may be arranged on the machine body 19.

The other contents are the same as those of Embodiment 1.

Embodiment 5

Figure 10:
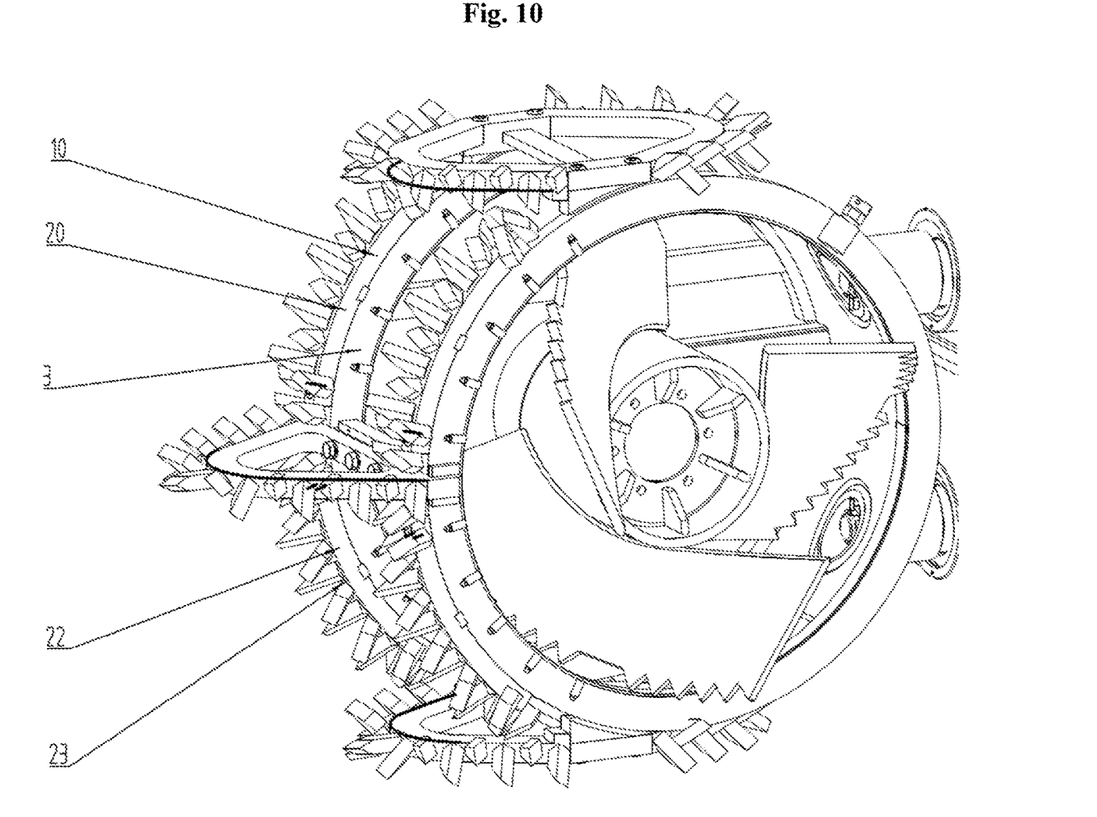
FIG. 10 shows the structural diagram of the rotary clearing device in a stripping tooth holder in Embodiment 4.

As shown in FIG. 10, the reciprocating impact saw plate 10 includes a reciprocating impact saw blade 20, the stripping tooth holder 3 includes a material impact section 22, and the reciprocating impact saw blade 20 is arranged along the material impact section 22, such that the stripping tooth holder 3 forms a tooth ring frame impact saw 23 towards the material.

Figure 11:
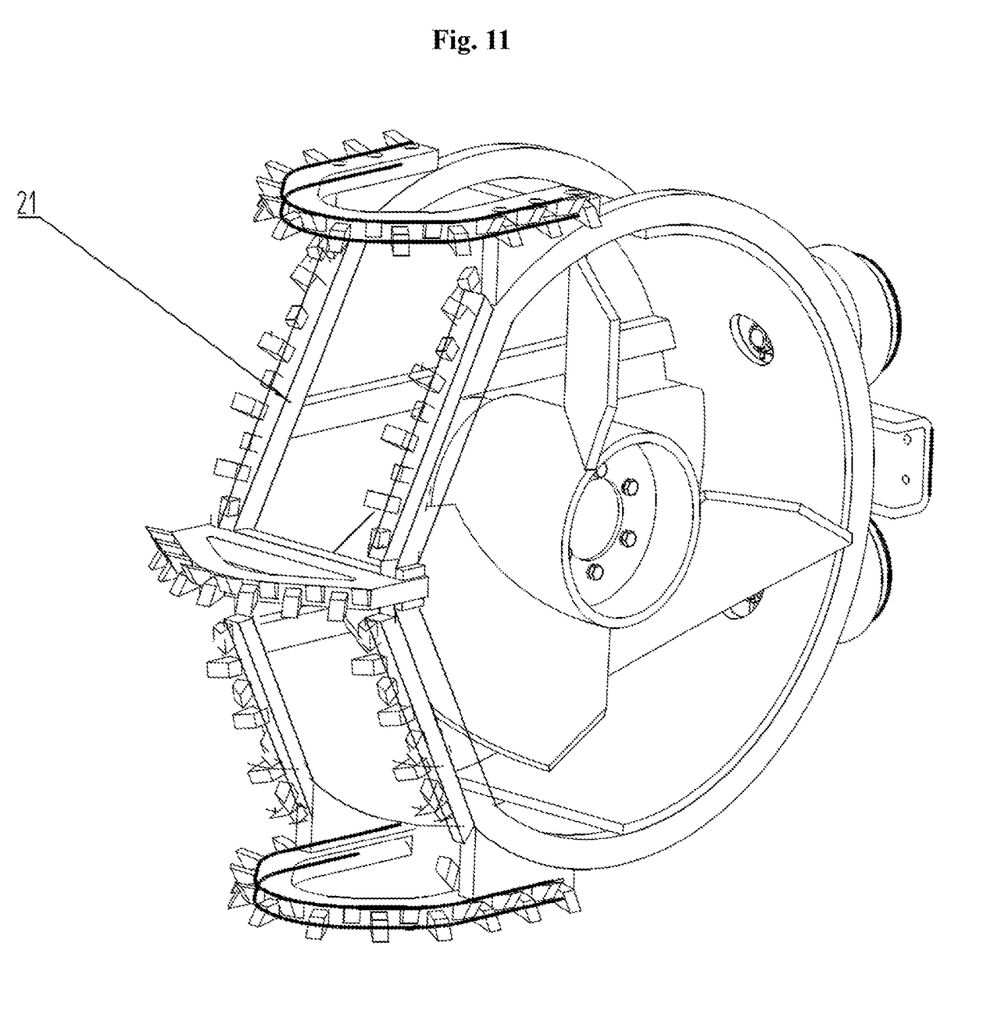
FIG. 11 shows the structural diagram of the rotary clearing device in a stripping tooth holder in Embodiment 3.

As shown in FIG. 11, the reciprocating impact saw plate 10 may also include a reciprocating impact saw rhombic frame 21 or a reciprocating impact saw rectangular frame or a reciprocating impact saw circular frame or a reciprocating impact saw elliptical frame.

The other contents are the same as those of Embodiment 1.

Embodiment 6

Figure 12:
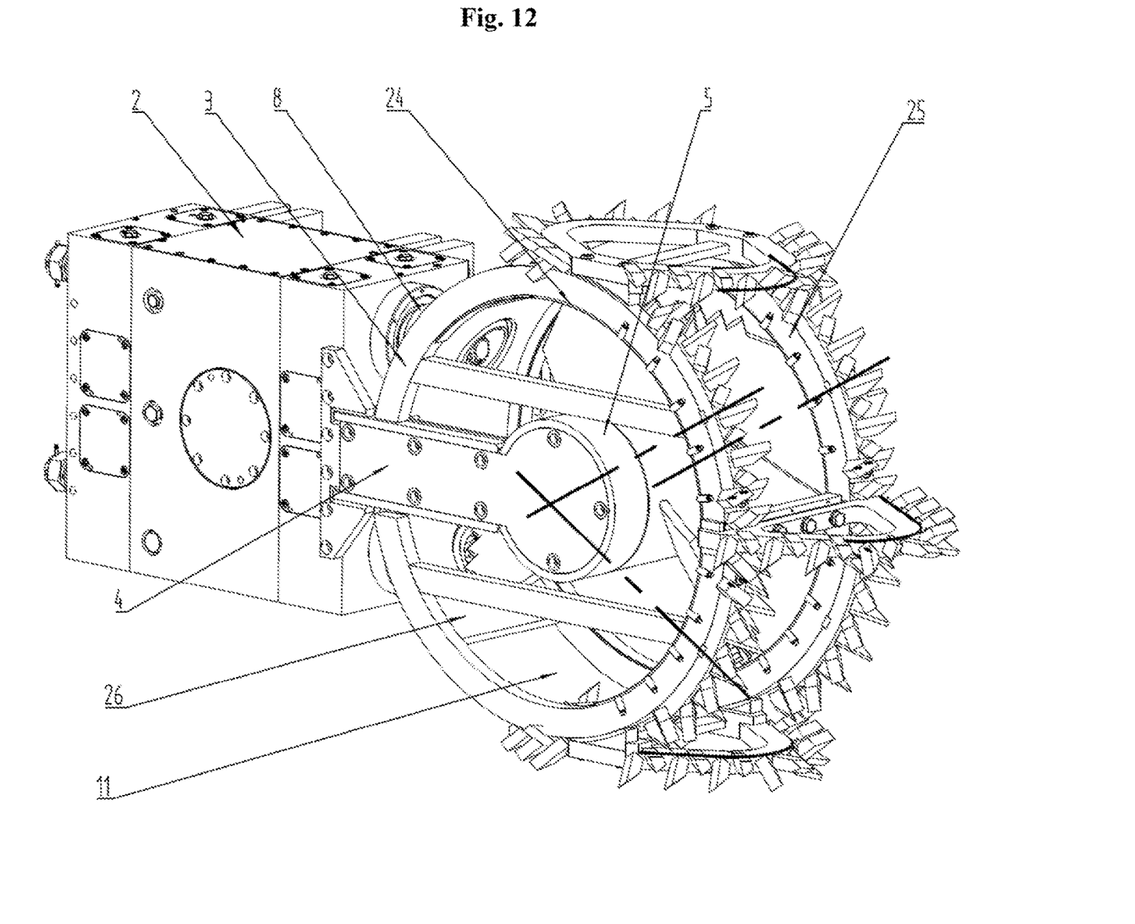
FIG. 12 shows the structural diagram of the rotary clearing device in a stripping tooth holder in Embodiment 3.

As shown in FIG. 12, the stripping tooth holder 3 includes a left stripping tooth ring 24 and a right stripping tooth ring 25, a tooth ring baffle plate 26 is arranged, towards the reciprocating impact power box 2, between the left stripping tooth ring 24 and the right stripping tooth ring 25, the stripping tooth holder 3 is connected to the reciprocating impact power box power member 8 through the tooth ring baffle plate 26, the reciprocating impact power box power member 8 drives the stripping tooth holder 3 to impact for sawing in a reciprocating manner, the rotary clearer supporting mechanism 4 is arranged on the reciprocating impact power box 2, the rotary clearer 5 rotates under supporting by the rotary clearer supporting mechanism 4, and when a lump material is stuck between the rotary clearer 5 and the stripping tooth holder 3, the stripping tooth holder 3 reciprocates to break the lump material, such that the rotary clearer 5 may smoothly spirally push the material out of the rotary discharging tooth holder hole 11.

Alternatively, the stripping tooth holder 3 may be connected to the reciprocating impact power box power member 8 through the left stripping tooth ring 24 or the right stripping tooth ring 25.

Alternatively, the rotary clearer supporting mechanism 4 may be arranged on the machine body 19.

The other contents are the same as those of Embodiment 1.

Embodiment 7

Figure 13:
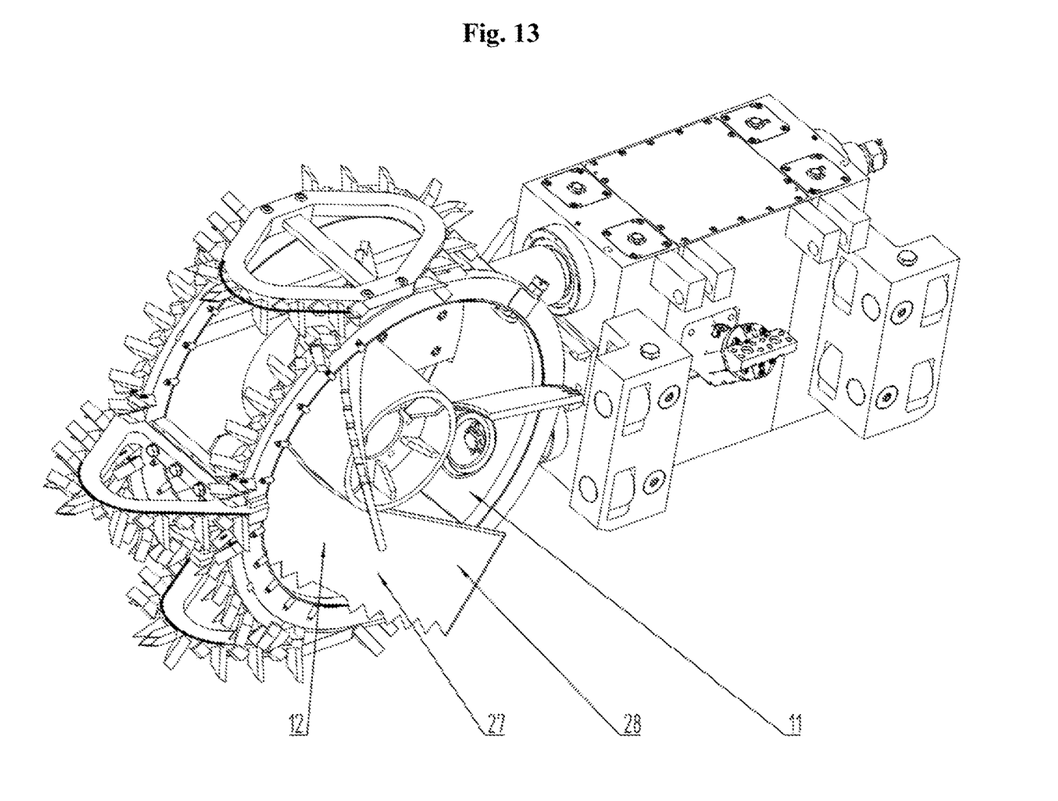
FIG. 13 shows the structural diagram of the rotary clearing device in a stripping tooth holder in Embodiment 3.

As shown in FIG. 13, the inclined clearing plate 12 includes curved clearing plates 27, the curved clearing plates 27 form a spiral clearer 28, and the material may be spirally pushed out of one side of the rotary discharging tooth holder hole 11 through the spiral clearer 28 conveniently.

The other contents are the same as those of Embodiment 1.

What is claimed is:

1. A method for rotary clearing in a stripping tooth holder of a reciprocating impact mining machine, wherein
   (1) a stripping tooth holder is arranged, a rear end of the stripping tooth holder being connected to a reciprocating impact power box power member, and a front end of the stripping tooth holder being provided with a reciprocating impact tooth or a reciprocating impact saw plate;
   (2) a rotary discharging tooth holder hole is provided between the rear end of the stripping tooth holder and the front end of the stripping tooth holder;
   (3) a shifter is arranged, specifically on a clearing drive roller to form a rotary clearer;

(4) a rotary clearer supporting mechanism is arranged on a reciprocating impact power box or the stripping tooth holder;

(5) the rotary clearer is arranged in the rotary discharging tooth holder hole of the stripping tooth holder, such that the rotary clearer rotates supported by the rotary clearer supporting mechanism;

(6) the stripping tooth holder is driven to make the reciprocating impact tooth or the reciprocating impact saw plate strip off material from a material wall; and (7) the clearing drive roller is made to rotate, and the material stripped off by the stripping tooth holder is spirally pushed by the shifter to a conveyor.

2. A mining machine having a rotary clearing device in a stripping tooth holder usable in the method of claim 1, comprising a reciprocating impact power box, a stripping tooth holder, a rotary clearer supporting mechanism and a rotary clearer, wherein the rotary clearer comprises a shifter and a clearing drive roller, the reciprocating impact power box comprises a reciprocating impact power box power member, the reciprocating impact power box power member supports and drives the stripping tooth holder, the rotary clearer supporting mechanism is arranged on the reciprocating impact power box or on the stripping tooth holder, a rear end of the stripping tooth holder is connected to the reciprocating impact power box power member, a front end of the stripping tooth holder is provided with a reciprocating impact tooth or a reciprocating impact saw plate, the stripping tooth holder comprises a rotary discharging tooth holder hole, the rotary clearer is arranged in the rotary discharging tooth holder hole of the stripping tooth holder, the rotary clearer rotates supported by the rotary clearer supporting mechanism, the clearing drive roller rotates to drive the shifter, and the shifter spirally pushes material stripped off by the stripping tooth holder out of the rotary discharging tooth holder hole.

3. The mining machine having a rotary clearing device in a stripping tooth holder according to claim 2, wherein the shifter comprises an inclined clearing plate or an inclined clearing tooth or a clearing rake or a clearing flat plate, a surface of the inclined clearing plate forms a discharging included angle with an axis of the clearing drive roller, and the inclined clearing plate rotates to drive the material out of the rotary discharging tooth holder hole under the discharging included angle, so as to clear the material stripped off by the stripping tooth holder in time and prevent material accumulation and blockage.

4. The mining machine having a rotary clearing device in a stripping tooth holder according to claim 3, wherein the inclined clearing plate comprises curved clearing plates, the curved clearing plates form a spiral clearer, and the material can be spirally pushed out of one side of the rotary discharging tooth holder hole through the spiral clearer conveniently.

5. The mining machine having a rotary clearing device in a stripping tooth holder according to claim 2, wherein the rotary discharging tooth holder hole comprises a circular discharging hole, a rectangular discharging hole or an elliptical discharging hole, and when the circular discharging hole is used, an axis of the circular discharging hole and an axis of the rotary clearer are coaxial, for facilitating clearing of a large quantity of material in the rotary discharging tooth holder hole, or not coaxial.

6. The mining machine having a rotary clearing device in a stripping tooth holder according to claim 2, wherein the mining machine comprises a machine body, the machine body supports the reciprocating impact power box, and the rotary clearer supporting mechanism is arranged on the reciprocating impact power box or on the machine body.

7. The mining machine having a rotary clearing device in a stripping tooth holder according to claim 2, wherein the reciprocating impact saw plate comprises a reciprocating impact saw blade or a reciprocating impact saw rhombic frame or a reciprocating impact saw rectangular frame or a reciprocating impact saw circular frame or a reciprocating impact saw elliptical frame, the stripping tooth holder comprises a material impact section, and the reciprocating impact saw blade is arranged along the material impact section, such that the stripping tooth holder forms a tooth ring frame impact saw towards the material.

8. The mining machine having a rotary clearing device in a stripping tooth holder according to claim 2, wherein the stripping tooth holder comprises a left stripping tooth ring and a right stripping tooth ring, a tooth ring baffle plate is arranged, towards the reciprocating impact power box, between the left stripping tooth ring and the right stripping tooth ring, the stripping tooth holder is connected to the reciprocating impact power box power member through the tooth ring baffle plate or the left stripping tooth ring or the right stripping tooth ring, the reciprocating impact power box power member drives the stripping tooth holder to impact for sawing in a reciprocating manner, the rotary clearer supporting mechanism is arranged on the reciprocating impact power box or on the machine body, the rotary clearer rotates supported by the rotary clearer supporting mechanism, and when a lump material is stuck between the rotary clearer and the stripping tooth holder, the stripping tooth holder reciprocates to break the lump material, such that the rotary clearer can smoothly spirally push the material out of the rotary discharging tooth holder hole.

\* \* \* \* \*